United States Patent
Mohr

Patent Number: 5,308,946
Date of Patent: May 3, 1994

[54] INDUCTION HEATING APPARATUS AND METHOD FOR HEATING METAL STRIPS AND SLABS

[76] Inventor: Glenn R. Mohr, P.O. Box 52, 710 Andover Rd., Linthicum, Md. 21090-0052

[21] Appl. No.: 831,820

[22] Filed: Feb. 6, 1992

[51] Int. Cl.$^5$ ............................................. H05B 5/06
[52] U.S. Cl. .................... 219/645; 219/646; 219/653; 219/672; 219/624
[58] Field of Search ...................... 219/10.61 R, 10.43, 219/10.71, 10.73, 10.77, 10.79, 10.75, 10.57, 10.41

[56] References Cited

U.S. PATENT DOCUMENTS

| | | | |
|---|---|---|---|
| 2,419,116 | 4/1947 | Cassen et al. | 219/10.61 R |
| 2,902,572 | 9/1959 | Lackner et al. | 219/10.61 R |
| 3,444,346 | 5/1969 | Russell et al. | 219/10.61 R |
| 3,612,804 | 10/1971 | Balzer | 219/10.61 R |
| 4,484,048 | 11/1984 | Travers et al. | 219/10.43 |
| 4,778,971 | 10/1988 | Sakimoto et al. | 219/10.61 R |
| 4,795,872 | 1/1989 | Hagisawa et al. | 219/10.61 R |
| 5,055,647 | 10/1991 | Heyes et al. | 219/10.43 |

Primary Examiner—Bruce A. Reynolds
Assistant Examiner—Tu Hoang
Attorney, Agent, or Firm—Charles E. Brown

[57] ABSTRACT

This disclosure relates to an apparatus for and a method of electrical inductance heating of metal strips and slabs. The heating method involves a plurality of pairs of individual electrical coils exposed on opposite sides of a path of movement of a metal strip or slab wherein the coils are elongated longitudinally of the path of movement of the metal member, such as a strip or slab, whereby the pattern of heating is in the way of stripes. Further, to eliminate any pulsing of current within the strip or slab being heated, each coil is spaced from a transversely adjacent coil a distance corresponding substantially to the effective heating width of that coil. The coils of a next longitudinal adjacent set of coils are transversely offset relative to the coils of the first mentioned set of coils so that each coil of the second set is aligned with a space between coils of the first set. This provides for a heating of the strip or slab in stripes and prevents overheating of the edges of the strip or slab. Further, the energization of the individual coils may be controlled in accordance with the existing temperature of that area of a strip or slab to be heated by the coils so as to heat a non-uniformly heated strip or slab to a uniform overall temperature.

14 Claims, 4 Drawing Sheets

INDUCTION HEATING APPARATUS AND METHOD FOR HEATING METAL STRIPS AND SLABS

This invention relates in general to new and useful improvements in induction heating of metal strips and slabs formed of copper, aluminum, stainless steel, magnesium, etc. and most particularly to the induction heating of ferrous slabs at temperatures above Currie to a slab rolling temperature.

BACKGROUND OF THE INVENTION

Over forty years ago there was developed a method of transverse flux induction heating wherein induction heating coils were arranged in side-by-side relation transversely of a path of movement of sheet metal. These coils were arranged in pairs on opposite sides of the path of such moving sheet metal. This transverse flux induction heating had a number of deficiencies including the overheating of strip edges only. In transverse flux induction heating, little or no current flows under the slot area between adjacent coils while most of the current flow is under the poles of the coils. As the strip starts to move, the strip becomes a conductor flowing through a field and a second current flows. Due to the second current there is loading under the poles and no loading under the slots. In other words, the loading is pulsating. A pulse can be made up of a fundamental plus harmonics. The wider the strip, the lower the inductance at the edges of the strip. The harmonics generated will flow where there is a minimum inductance which is along the edges.

Further, with transverse flux heating of steel, there is up to 80% efficiency. Normal induction heating is only 40% efficient or less.

The biggest problems with using transverse flux induction heating have been:
1. The edges have overheated and must be sheared off as scrap.
2. Overheating of the edges increase with strip speed.
3. Prior transverse flux induction heating setups could only accommodate one strip width.
4. The thickest slab that could be heated was less than ½ inch.

GENERAL DISCUSSION OF INVENTION

In accordance with this invention it is proposed to utilize the advantages of transverse flux induction heating while substantially eliminating the disadvantages of such heating. Most particularly, in accordance with this invention, electrical heating coils are arranged to extend longitudinally of the path of the moving strip or slab. Next, the heating coils are disposed in spaced relation transversely of the path of movement of the strip or slab being heated with the effective width of a coil being substantially equal to the spacing between coils. The net result is a plurality of longitudinally extended heated areas separated by unheated areas in alternating relation transversely of the path of movement of the strip or slab. This heated and unheated arrangement is compensated for by providing the coils in transverse sets with the coils in adjacent sets being offset from one another. Thus one set of coils provide heated and unheated areas while the next adjacent set of coils will provide for the heating of the unheated areas and the non-heating of the previously heated areas. This arrangement provides for many possibilities including the possibility that the number of coils in a transverse set may be divided into a number of adjacent transverse arrangements so as to permit either the heating of a single wide strip or slab or the simultaneous heating of several strips or slabs. Further, by providing suitable control devices, the amount of heating which occurs may vary transversely of the moving strip or slab to provide for an overall uniform heating of a strip or slab.

With the above and other objects in view that will hereinafter appear, the nature of the invention will be more clearly understood by reference to the following detailed description, the appended claims, and the accompanying drawings.

DESCRIPTION OF PRIOR ART

Figure 1:
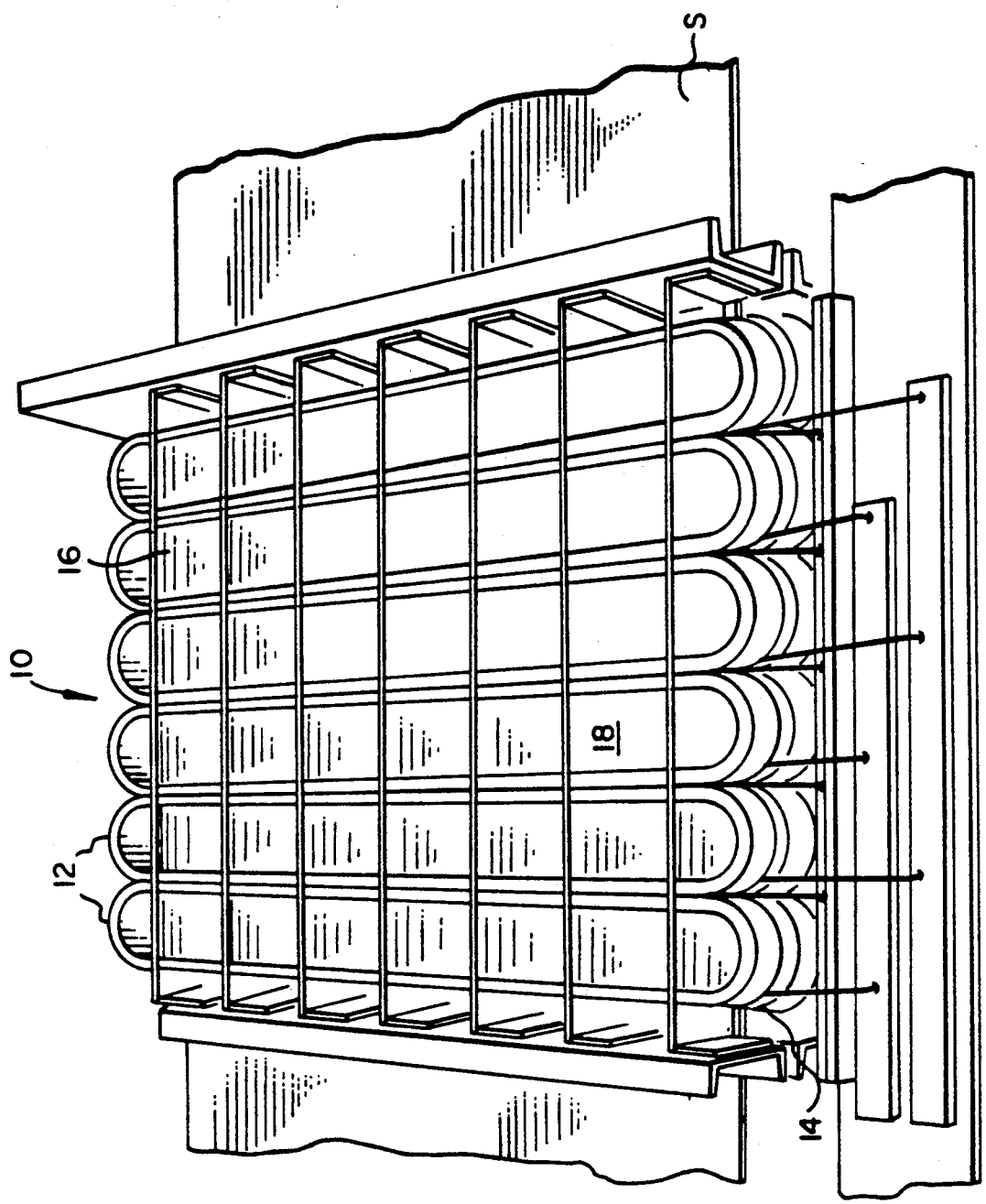
FIG. 1 is an elevational view of a schematic plan view of a prior art transverse flux heating coil arrangement.
Figure 2:
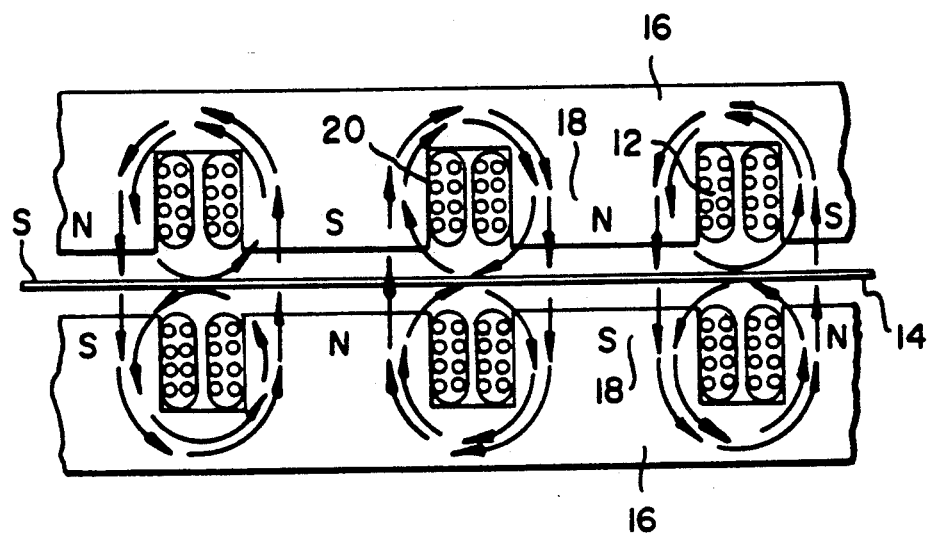
FIG. 2 is a schematic vertical sectional view taken through the coil structure of FIG. 1 and shows the flux paths of such coil arrangement.
Figure 3:
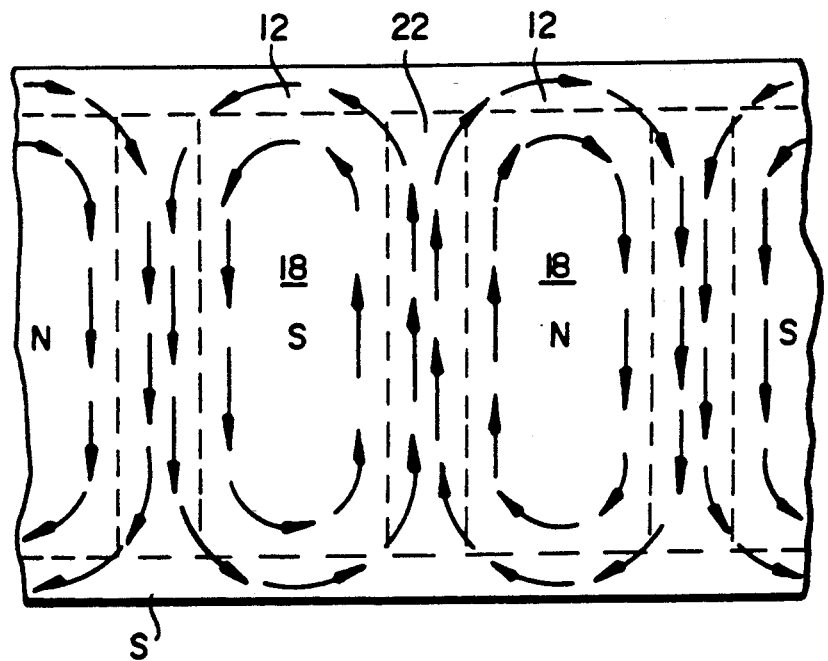
FIG. 3 is a schematic view of the current paths in a slab being heated by the coil arrangement of FIGS. 1 and 2.

Reference is now made to the prior art showing of FIGS. 1-3 wherein there is illustrated a typical transverse flux induction heating apparatus. This apparatus is generally identified by the numeral 10. The apparatus 10 is formed by a plurality of pairs of electrical heating coils 12 with there being a heating coil 12 of each pair on opposite sides of a pair 14 for a strip or slab to be heated to move. The coils 12 are elongated and of a length generally corresponding to the width of a strip or slab to be heated. The coils 12 are disposed in closely adjacent parallel relation.

As is schematically illustrated in FIG. 2, each group of coils 12 on opposite sides of the path 14 is carried by a laminated pole structure 16. The pole structure 16 includes individual poles 18 within the coils 12 with the coils 12 being defined by windings of electrical conductors, preferably hollow copper conductors 20. Current flowing to the coils 12 is such that the opposing pole pieces 18 are opposite polarity, i.e. one pole piece 18 being a N pole piece and the other pole piece 18 being a S pole piece.

Referring now to FIG. 3, it will be seen that there is basically a slot 22 between adjacent coils 12. Further, the flux flow carried by each of the coils 12 is in the same direction of each of the slots 22.

It will also be seen from FIG. 3 that the strip or slab being heated is wider than the coils 12 and materially wider than the pole piece 18.

Transverse flux heating was developed over 40 years ago by R. M. Baker. Transverse induction heating, as illustrated in FIGS. 1-3 heats with an efficiency as high as 80% with the frequency of the electrical current supply of the coils 12 being low enough for the flux to pass through the slab or strip. Through heating starts from the first instance. Another reason for the fast and efficient heating is that the coils are mounted in slots in steel laminations. The strip or slab to be heated can be fed into the apparatus 10 either through the bottom or the top if the apparatus 10 is vertically disposed, or horizontally if the apparatus 10 is horizontally disposed.

Due to the current flowing in the coils and the slots, flux passes from N to S in the laminations and passes through the strip and induces the voltage that causes current to flow and heat the strip. The flux between the slots however, cancel and therefore little if any voltage generates the strip between the slots.

The strong field from N to S due to motor action forces the current to flow between the coils 12 where the field is weak. It is known that if the strip stops it will melt in the slot area if the power is not removed immediately.

When the strip or slab moves, the heating current is heavy between N and S and nearly 0 between the slots. This means that the load current is pulsed rather than being steady. Also, since there are a plurality of poles that are producing heat, the pulse has a high peak and almost 0 between pulses. A pulse can be analyzed into a fundamental plus higher frequency harmonics.

The inductance in the strip is miminal along the edges. High frequency flows where the inductance is minimal which causes the edges to overheat. The higher the speed and movement of the strip or slab between the coils, the higher the pulse rate and pulse height.

DESCRIPTION OF THE INVENTION

The apparatus 10 illustrated in FIGS. 1-3 can be beneficially utilized in accordance with this invention if the strip or slab to be heated is moved longitudinally of the coils 12 without overheating the edges thereof. While this would eliminate the pulsing action, it would result in the stripe heating of the strip or slab with areas between adjacent heating stripes being unheated.

Figure 4:
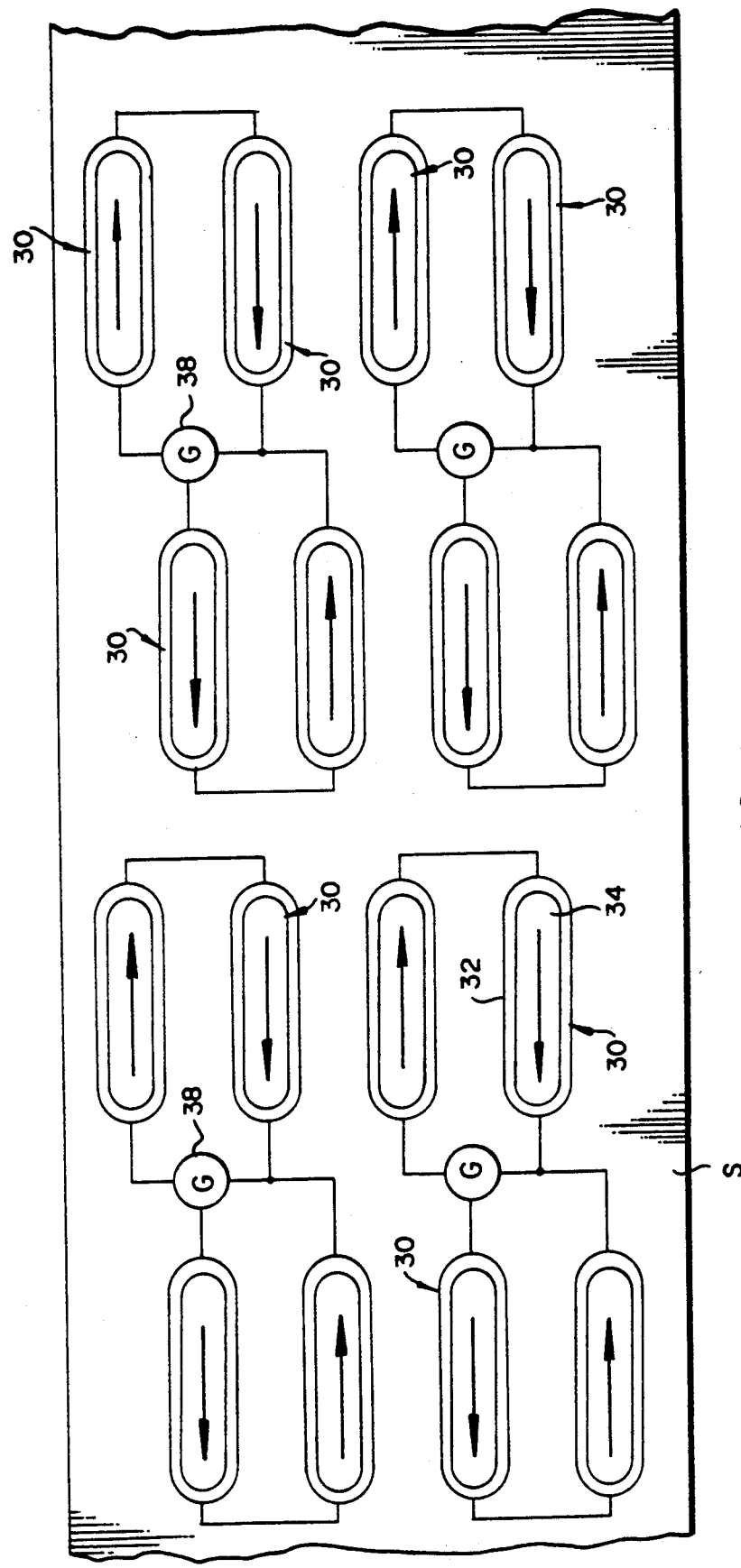
FIG. 4 is a schematic plan view of a typical induction heating coil arrangement in accordance with this invention.

In view of the strip heating, a proper induction heating apparatus in accordance with this invention would be formed of sets of heating coils arranged as generally illustrated in FIG. 4. The heating coils as illustrated in FIG. 4 will be of the same general construction as the heating coils 12 illustrated in FIGS. 1-3 and would be identified by the numeral 30. Each heating coil 30 would, of course, include a multiple winding 32 and a laminated steel pole piece 34.

The coils 30 are arranged in pairs, one coil on each side of a path of movement of a strip or slab S. In FIG. 4, it is illustrated only in the coils 30 which are disposed above the path of the strip or slab S.

As is clearly shown in FIG. 4, the coils 30 are arranged in longitudinally adjacent sets and extend longitudinally of the path of the strip or slab S. Each set includes at least two coils 30 separated by a space 36. The width of the space 36 between coils is substantially equal to the respective heating width of a coil 30.

Continuing to refer to FIG. 4, it will be seen that in a next longitudinally adjacent set of coils 30, these coils are longitudinally aligned with the spaces 36 of the next adjacent coil sets. Further, it will be seen that sets of coils are repeated so as to provide multiple heating of all areas of the metal strip or slab S.

In FIG. 4, each set of coils 30 total four in number although a set of two coils only could be required for a particular width of strip or slab S. Thus, with the apparatus shown in FIG. 4, it is possible to simultaneously heat two single width strips or slabs or one double width strip or slab. Further, it is possible to heat a single width strip or slab. In addition, although it is not specifically shown, it is to be understood that each transverse set of coils could include six, eight or more coils depending upon the desired width of the strip or slab to be heated. Further, while there has been illustrated only four sets of coils, depending upon the desired temperature rise, there could be six, eight, ten or more sets of coils arranged longitudinally of the path of movement of the strip or slab S.

Figure 5:
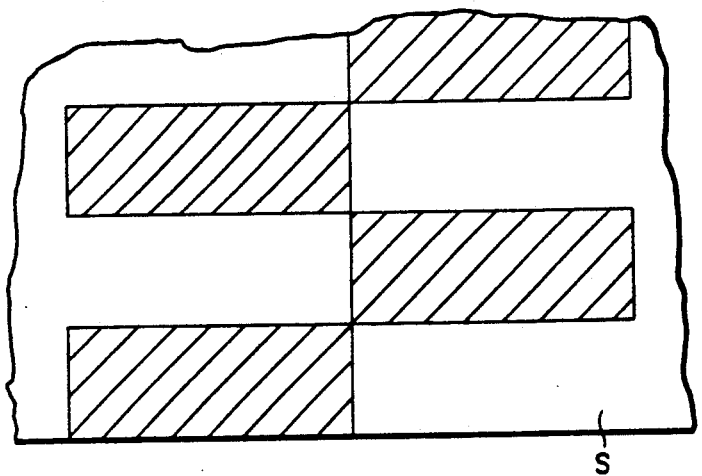
FIG. 5 is a schematic plan view showing the instantaneous induction of electrical energy and thus heat into a strip or slab with the arrangement of FIG. 4.

Referring now to FIG. 5, it will be seen that the heating of the strip or slab S will be in stripes and at any moment only certain portions of the areas of the stripes will be heated due to the arrangement of the coils 30. Of course, it is to be understood that as a strip or slab S passes under one of the coils 30, that area of the strip or slab aligned with the coil will be continuously heated. The total heating will be equal to the capacity of the coils 30 and the number of pairs of sets of coils. It will be seen that the transverse outermost coil in each transverse arrangement of coils will be spaced from the edge of the path of the strip or slab S so as to provide for proper heating of the edge of the strip or slab being heated.

It is to be understood that utilizing 60 hertz current, various non-ferrous metals and ferrous metals above the Currie temperature may be efficiently heated without overheating of edges.

Returning once again to FIG. 4, it will be seen that two longitudinally adjacent sets of coils 30 may be energized from a single power source 38. This power source, may be readily controlled between an on or off condition so as to control the amount of heating of a strip or slab S. Further, the power source 38 could be in the form of a generator so as to produce a frequency other than, normally lower than, a 60 hertz frequency. A particular slab heating problem now exists in the industry. These slabs are cast of steel having a width as wide as 60 inches and a thickness on the order of 2 inches. The cast slabs are not immediately ready for rolling so as to reduce the thickness thereof and as a result, these slabs pass through very elongated tunnels which are of an insulated construction and which are gas heated. The tunnels are expensive to construct and further the gas heating is very expensive. The slabs may be electrically induction heated as long as they are above the Currie temperature. It is acknowledged here that it is feasible to heat a 2 inch thick steel slab utilizing 60 hertz current. However, some companies are looking into heating slabs of a width up to 120 inches and a thickness greater than 2 inches such as a 4 inch or 6 inch thickness and even greater. It has been found by me that when the slab is of a thickness greater than 2 inches, the induced current does not sufficiently penetrate the thickness of the slab and thus the slab is heated from the outside towards the center by conduction with a great heat loss. By reducing the frequency of the current supply to the induction coils, it is possible for the reduced current to penetrate the slab generally to the center of such slab so as to provide a more uniform heating of the slab with a minimal heat loss. Therefore, if generators are used as the power source 38, the frequency of the current supplied to the coils 30 may be varied to that which is the most efficient for the particular thickness of the slab.

Figure 6:
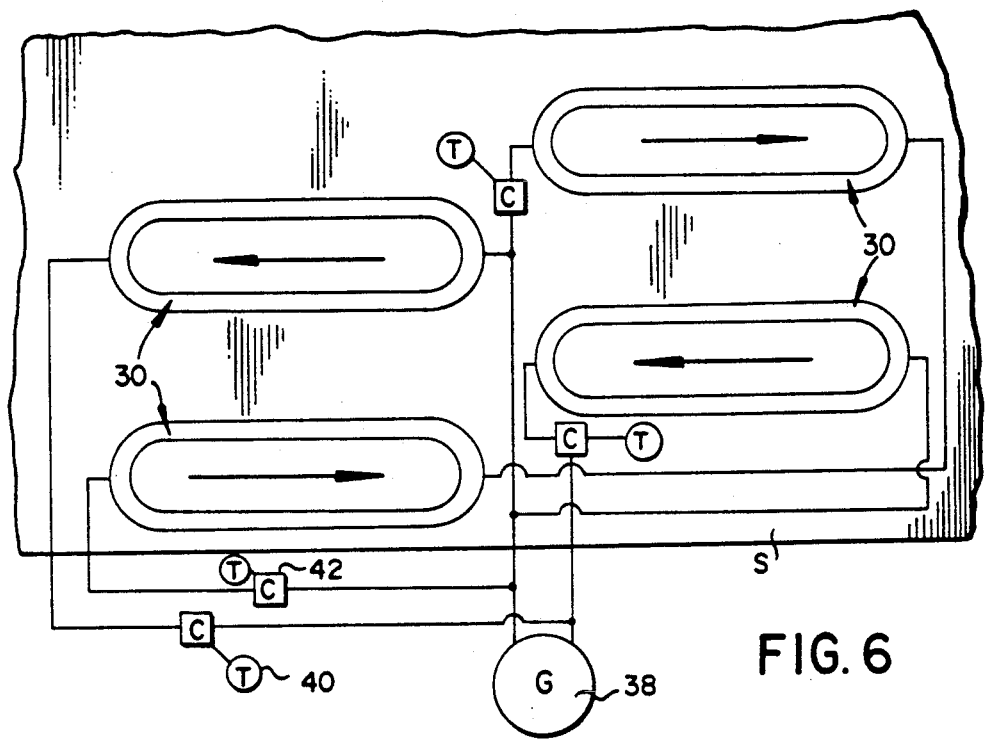
FIG. 6 is a fragmentary schematic view showing the coil arrangement of FIG. 4 but with a modified control arrangement permitting the timing of heating of a strip or slab in accordance with detected temperatures of a strip or slab due to prior heating.

It has also been found that because of various factors, the slab which is to be heated from above the Currie temperature to the rolling temperature may not be presented to the induction heating apparatus at a uniform temperature. Therefore, portions of the partially heated slab may require more heat than ever. To this end, there is provided a modified control arrangement as is shown in FIG. 6.

The control arrangement for each coil 30 may include a power source 38 in the same manner as the two longitudinally adjacent sets of coil arrangements shown in FIG. 4. However, each individual coil 30 may be separately energized but with the current flow in the windings 32 being that illustrated in FIG. 4.

The control unit for each coil 30 includes a temperature sensor 40 which is generally aligned with that stripe area of the slab S which is centered relative to an associated coil 30. The temperature sensor 40 then controls the operation of a control device 42 which controls the electrical connection of a particular coil 30 with the power source 38.

Figure 7:
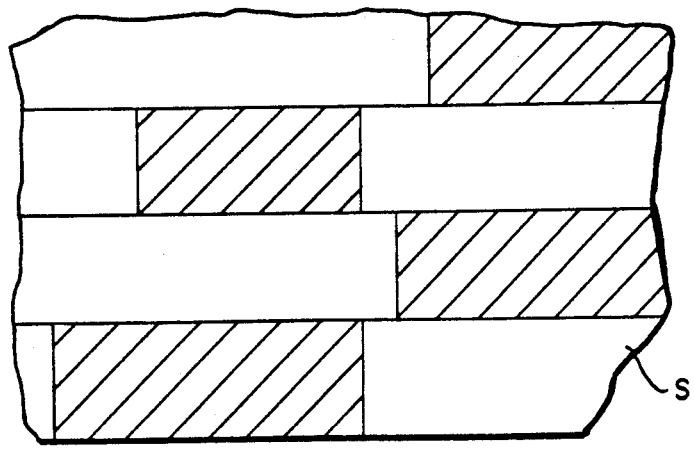
FIG. 7 is a schematic plan view showing a variation in the heated area of a strip or slab utilizing the control of FIG. 6.

Assuming that the detected temperature of a slab S across the slab is uniform, then a control device 42 does not operate and the heating will be uniform as is shown in FIG. 5. On the other hand, assuming that some of the stripe areas of the slab are heated to a higher temperature than others, then the length of time which the coils 30 are energized will be varied so as to eliminate the temperature differential and to heat the slab to a uniform temperature. Thus, the initiation of the heating of the slab by a particular coil 30 will vary depending upon the detected temperature of stripe areas of the slab as is clearly illustrated in FIG. 7.

Because the heat is induced into the slab with penetration of the induced heat being to the center of a slab, it will be seen that there is much less heat loss from the slab than occurs if the heat directed into the slab is external such as from a gas flame.

In addition, by electrical inductance heating the slab in a controlled atmosphere, the usual surface crusting is eliminated.

Although only a preferred embodiment of inductance heating apparatus and method of utilizing the same has been specifically illustrated and described herein, it is to be understood that minor variations may be made in the apparatus and method without departing from the spirit and scope of the invention as defined by the appended claims.

I claim:

1. An apparatus for heating moving elongated metal members selectively in the form of a metal strip and slab, said apparatus comprising pairs of cooperating elongated electrical coils, said coil pairs being in spaced parallel relation to define a coil elongation, coils of each of said pairs being in spaced parallels relation to form a space therebetween, the space between soils of said pairs of coils defining a path for moving members between said coils extending longitudinally of the coil elongation, and said pairs of coils including a plurality of coil sets spaced longitudinally of one another, said coil sets including first and second coil sets with pairs of coils in each of said coil sets being spaced transversely of said path and pairs of coils in one of two longitudinally adjacent coil sets being transversely offset from pairs of coils in the other of said longitudinally adjacent coil sets, wherein said coils provide means for forming in a member moving longitudinally of said coils first transversely alternating heated and non-heated strip-like areas and then heating only said non-heated strip-like areas.

2. An apparatus according to claim 1 wherein each of said coil sets includes at least two transversely spaced coil pairs.

3. An apparatus according to claim 1 wherein said coil sets are located at longitudinally adjacent stations, and there are at least two transversely spaced and adjacent coil sets at each of said stations.

4. An apparatus according to claim 1 wherein said path has edges spaced transversely from all of said coils to prevent overheating of edges of a member being heated.

5. An apparatus according to claim 1 wherein each coil set includes at least two pair of coils in transversely spaced relation and said at least two longitudinally adjacent coil sets form a group, and there is a single power source for each group.

6. An apparatus according to claim 5 wherein said apparatus is adapted for heating previously heated metal members which are non-uniformly heated, there are thermostatic means associated with said coils for checking the temperature of portions of moving heated metal members.

7. An apparatus according to claim 6 wherein there are control means responsive to said thermostatic means for controlling time of actuation of each power source in accordance with said temperature.

8. An apparatus for electrical induction heating metal member in the form of strips and slabs, said apparatus comprising a path for a moving metal member defined by spaced opposed pairs of coils arranged in groups on opposite sides of said path, said coils of each group of pairs of coils including sets of longitudinally extending coils arranged in transversely spaced relation, coils of longitudinally adjacent sets being arranged with coils in one set being aligned with spaces between coils in a next set to provide means for heating a metal member moving along said path to first define heated longitudinal areas separated by unheated longitudinal areas and then heating said heated area without further heating said unheated areas.

9. A method of reheating a previously heated metal member selectively in the form of a strip and slab, said method comprising the steps of providing a plurality of pairs of electrical coils defining a path for movement of a member with pairs of electrical coils being elongated longitudinally opposite sides of said path, and said pairs of electrical coils being spaced both transversely of said path and longitudinally of said path in alternating relation with coils of a transverse set being aligned with spaces between coils of a next adjacent transverse set, and passing a heated member along said path to further heat said member.

10. The method of claim 9 wherein said member is a newly cast metal member.

11. A method according to claim 9 wherein said pairs of electrical coils are provided for alternatively and longitudinally heating said member in longitudinally extending and transversely spaced areas.

12. A method according to claim 11 wherein said electrical coil pairs are arranged in coil sets each including at least two pairs of coils in transversely spaced relation and at least two longitudinally adjacent coil sets form a group with there being a single power source for said group, and said power source is selectively energized to control time of heating and lengths of heated areas.

13. A method according to claim 12 wherein each power source is provided with a thermostatic control for controlling time of energization of said coil sets of said group in accordance with detected temperatures of areas of said heated member to be further heated by said group.

14. A method according to claim 13 wherein said coils provide for the heating of a non-uniformly heated metal member to an uniform heating temperature for said metal member.

* * * * *